US007818192B2

(12) United States Patent
Kymal et al.

(10) Patent No.: US 7,818,192 B2
(45) Date of Patent: Oct. 19, 2010

(54) QUALITY INFORMATION MANAGEMENT SYSTEM

(75) Inventors: Chandran Kymal, Ann Arbor, MI (US); Gregory Francis Gruska, Farmington Hills, MI (US); Justin Bradford Schiller, Ann Arbor, MI (US); Ge Zhang, Ann Arbor, MI (US); David Kerry Watkins, Ann Arbor, MI (US); Mark Stephen Sebastian, Fowlerville, MI (US)

(73) Assignee: Omnex Systems L.L.C., Ann Arbor, MI (US)

( * ) Notice: Subject to any disclaimer, the term of this patent is extended or adjusted under 35 U.S.C. 154(b) by 851 days.

(21) Appl. No.: 10/547,254

(22) PCT Filed: Mar. 1, 2004

(86) PCT No.: PCT/US2004/006227

§ 371 (c)(1),
(2), (4) Date: May 30, 2006

(87) PCT Pub. No.: WO2004/079528

PCT Pub. Date: Sep. 16, 2004

(65) Prior Publication Data

US 2006/0253289 A1 Nov. 9, 2006

Related U.S. Application Data

(60) Provisional application No. 60/450,628, filed on Feb. 28, 2003.

(51) Int. Cl.
*G06F 17/50* (2006.01)
*G06F 11/34* (2006.01)

(52) U.S. Cl. .......................................... 705/7; 705/11

(58) Field of Classification Search ............... 703/2, 703/6; 705/1, 7–12, 26, 27, 28, 30, 400, 705/500; 700/109, 108, 83, 17; 715/810, 715/771, 763, 764, 765, 700; 702/188
See application file for complete search history.

(56) References Cited

U.S. PATENT DOCUMENTS

| | | | | |
|---|---|---|---|---|
| 5,887,154 | A * | 3/1999 | Iwasa et al. | 703/6 |
| 5,926,794 | A * | 7/1999 | Fethe | 705/11 |
| 5,953,707 | A * | 9/1999 | Huang et al. | 705/10 |
| 7,035,786 | B1 * | 4/2006 | Abu El Ata et al. | 703/21 |
| 7,165,036 | B2 * | 1/2007 | Kruk et al. | 705/1.1 |
| 7,181,413 | B2 * | 2/2007 | Hadden et al. | 705/11 |
| 7,200,219 | B1 * | 4/2007 | Edwards et al. | 379/265.01 |
| 7,263,474 | B2 * | 8/2007 | Fables et al. | 703/6 |

(Continued)

OTHER PUBLICATIONS

Godfrey: Electronic Work Monitoring: An Ethical Model; pp. 4; 2001.*

*Primary Examiner*—Igor Borissov
(74) *Attorney, Agent, or Firm*—Brooks Kushman P.C.

(57) ABSTRACT

Computer system for controlled creation, processing, administration and display of quality information within an enterprise. Linkages may be defined among enterprise entities, process/product development attributes, strategies, goals, process improvement opportunities, etc. Visual analysis of data associated with the linkages is provided in an interactive fashion. Linkages may also be defined among online quality-related documentation throughout an enterprise such that information is automatically propagated/reconciled through the enterprise in a controlled and efficient fashion. The creation of process documentation for new products is facilitated based on a concept of content/document inheritance.

9 Claims, 14 Drawing Sheets

U.S. PATENT DOCUMENTS

| | | | |
|---|---|---|---|
| 2001/0044738 A1* | 11/2001 | Elkin et al. | 705/8 |
| 2002/0133394 A1* | 9/2002 | Bushey et al. | 705/10 |
| 2003/0101091 A1* | 5/2003 | Levin et al. | 705/11 |
| 2003/0130883 A1* | 7/2003 | Schroeder et al. | 705/10 |
| 2003/0229529 A1* | 12/2003 | Mui et al. | 705/8 |
| 2004/0088177 A1* | 5/2004 | Travis et al. | 705/1 |
| 2007/0074220 A1* | 3/2007 | Edwards et al. | 718/104 |

* cited by examiner

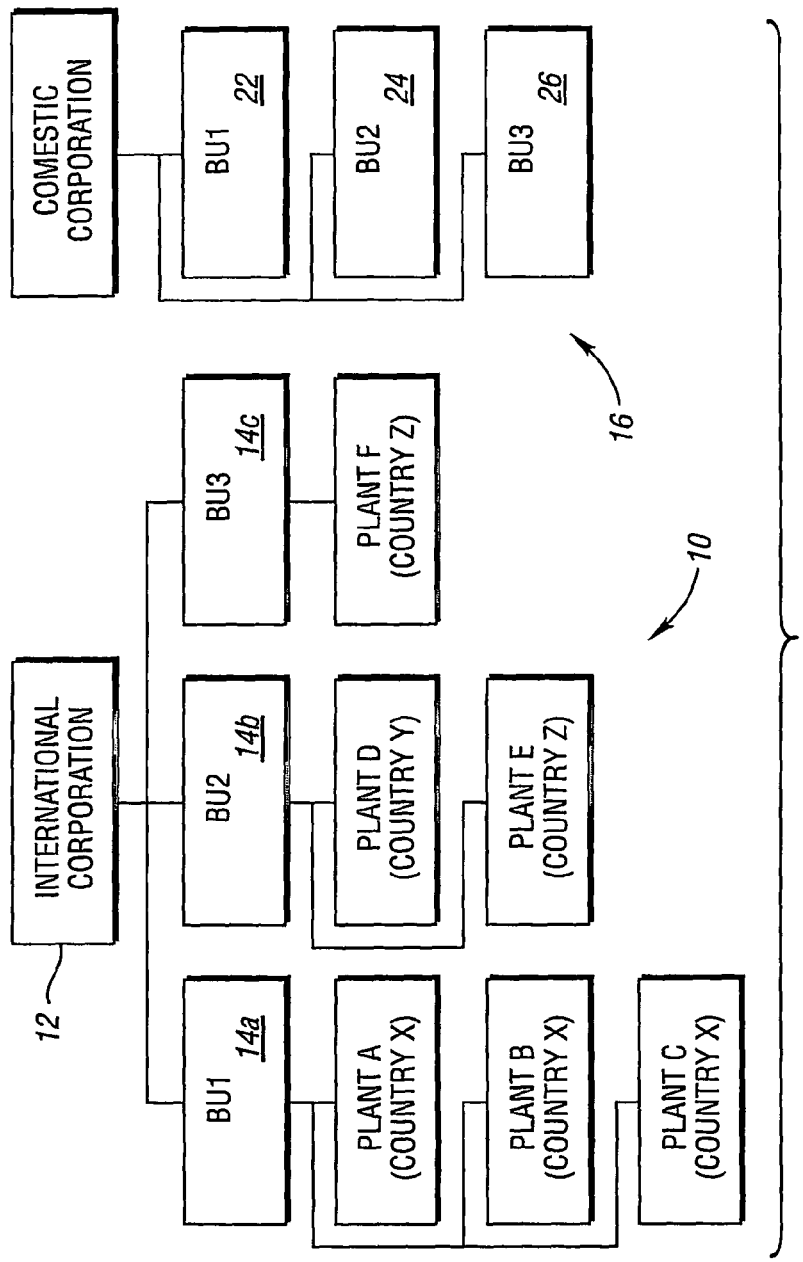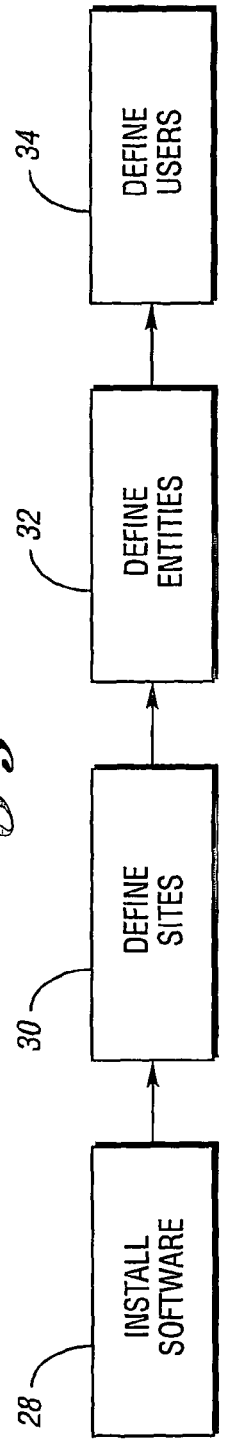
Fig. 2
Fig. 3

Document   MKT-EwQMS

Select Documents to Link

| Level | Documents |
|---|---|
| 1 | QM1 |
| 2 | WO0003 |
| 3 | WWO0189 |
| 4 | FO0001 |
| 5 | EV1234_test9 |
| 6 | |
| 55 | |
| 98 | |
| 99 | |

Related level 99 documents

All level 99 documents

MKT-AQuAProPDF: AQuAPro Color PDF File (Brochure)
MKT-AuditProPDF: Audit Pro Color PDF File (Brochure)
MKT-BOSSPDF: BOSS Color PDF File (Brochure)
MKT-DocumentProPDF: Document Pro Color PDF File (B
MKT-EwQMSPDF: EwQMS Color PDF File (Brochure)
MKT-HPRProPDF: HR Pro Color PDF File (Brochure)
MKT-MSAProPDF: MSA Pro Color PDF File (Brochure)
MKT-ProcessProPDF: Process Pro Color PDF File (Broch Save

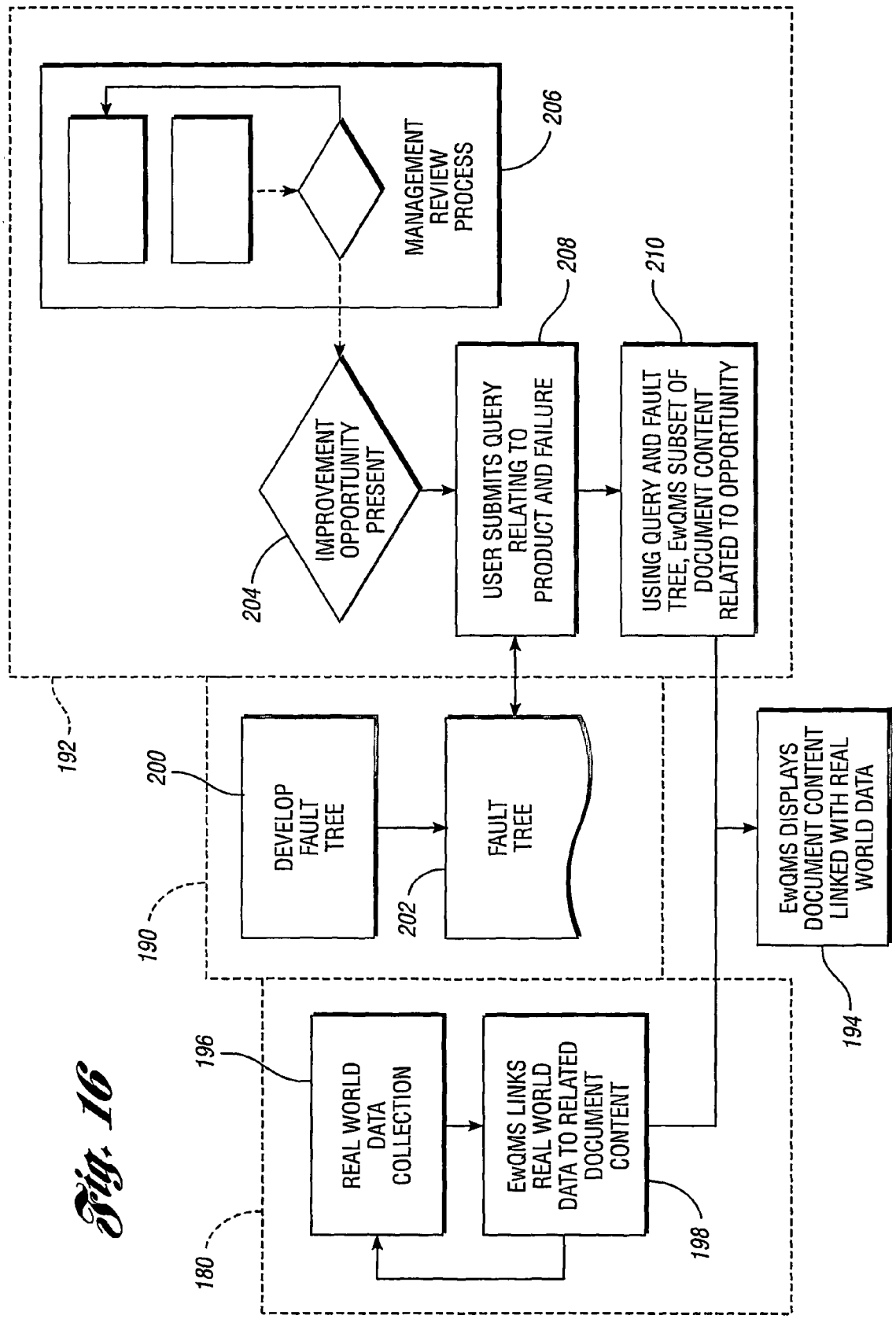

QUALITY INFORMATION MANAGEMENT SYSTEM

CROSS-REFERENCE TO RELATED APPLICATIONS

This application claims the benefit of a U.S. provisional application Ser. No. 60/450,628 filed Feb. 28, 2003.

BACKGROUND OF THE INVENTION

1. Field of the Invention

Embodiments of the present invention relate generally to enterprise and supply chain quality management, and more specifically to computer-implemented methods, computer applications and systems for quality management.

2. Background Art

Embodiments of the present invention may be implemented as an alternative or supplement to prior art methods and systems for quality information management. Notably, the following characterization of the prior art is not intended to set forth or limit that which the applicants regard as their invention.

Prior art quality management system ("QMS") packages are not designed to effectively support and integrate enterprise-wide (i.e. multi-site) quality information management. For site level control and management, conventional QMS packages must be loaded on site-specific computing platforms. Users must log into separate programs to view quality documents and information owned and maintained by diverse and/or distributed enterprise locations or sites. In addition, consolidation of information from several locations into an organization report requires duplication of data.

If an organization elects to implement a central (single) QMS, the administration of individual sites, and control of quality documents and information access is governed by a central administration. This reduces the value and efficiency of site autonomy in quality management. In addition, a single QMS arrangement requires that all "sites" utilize the same document levels and nomenclature.

Functionality for defining linkages among quality information is limited. For example, linkages often take users to another location within the QMS, without automatically providing the users with a return path. In addition, conventional linkages are static and can only be defined by an administrator—not the "owner" of the relevant information.

Another drawback associated with conventional quality management systems is their failure to effectively recognize and support entity and business relationship linkages across quality information. Without such linkages, an inefficient multi-level analysis of quality data is required.

Although certain limited functionality supporting quality data analysis and management is available in the market today, its is not integrated. Users are required to enter the same or similar information into several different applications. In addition, having multiple discrete applications to support quality data analysis and management involves porting common information from one application to another. Typically, different applications utilize different or proprietary data formats and thus require inefficient and error-prone data conversion. This inefficiency is compounded each time data is updated.

In the generation of product/process realization quality information, documentation and reports are conventionally developed with limited linkages among the various documents based on entity and business relationship linkage references. In addition, tracking of the quality data and information generated is not integrated with process review activities. Packages that do track quality data and information generated and related to transactional and business processes require unique, separately developed programs.

Furthermore, the comparison of achievement of one or more employees' goals to one or more corresponding goals for one or more business entities within the enterprise is not part of any continual quality improvement system.

Other drawbacks associated with conventional quality management systems include their failure to (i) recognize interrelationships among quality information, (ii) require a specific order and timing of information entry, and/or (iii) support interdependence among quality information within a single QMS function.

Conventional QMS packages do not support linkages among product realization information at the design level for the development and maintenance of linked product or process information. Conventional QMS packages also fail to support linkages among product and process realization information at the design level to the process level for the development and maintenance of linked product or process information. Yet another quality management function not support by conventional QMS packages includes linkages among product and process realization information that are used to identify and display quality information for product and process improvement.

Embodiments of the present invention will serve as an alternative or supplement to prior art QMS methods and systems to effectively eliminate or reduce some or all of the above drawbacks. Those in the art will recognize, however, that no single embodiment of the present invention can eliminate or reduce all drawbacks associated with all conventional QMS methods or systems.

SUMMARY OF THE INVENTION

One embodiment of the present invention comprises a quality information management system including one or more computers operably programmed and configured to receive input defining an entity associated with a business enterprise, receive input defining one or more expectation(s) for the entity, receive input linking one or more result measurable types to one or more of the expectations, receive input linking one or more processes to one or more of the expectations, receive input linking one or more process measurable types to one or more of the processes, receive input comprising result measurable data and process measurable data corresponding to the result measurable type(s) and process measurable type(s), respectively, and automatically process one or more data objects representing the result measurable data and the process measurable data to generate a visual representation of the result measurable data and the process measurable data wherein the visual representation is interactive enabling a user to selectively drill down or drill up through the result measurable data and the process measurable data based on the linkages.

The expectations may be customer expectations for a product or service. An interactive online chart may be displayed for defining the entity, defining the expectation(s), linking the result measurable types to the expectations, lining the processes to the expectations, and linking the process measurable types to the processes. The chart may be configured to display expectations which satisfy a user-defined constraint. The constraint may be an importance level. Data representing one or more goals for achieving the expectation(s) may be linked thereto. Data representing one or more employees within the enterprise may be linked to one or more of the goals for achieving the expectations.

The system may be programmed and configured to automatically evaluate the product or process measurable data with respect to the one or more goals and the one or more linked employees to display an indication of whether the employee(s) have achieved the goal(s). The indication may be a traffic light icon.

Another embodiment of the present invention comprises a quality information management system including one or more computers operably programmed and configured to receive input including a plurality of online documents, each document having one or more sections of information, receive input defining one or more linkages between a first section within a first online document, and a second section within a second online document having the same information as the first section, receive input changing the information within the first section of the first online document, and automatically reconcile the information within the second section of the second document to match the changed information within the first section of the first online document.

The system may be programmed and configured to automatically generate one or more new online documents based on the one or more linkages. The plurality of online documents may be accessible by a plurality of employees within a business enterprise.

Another embodiment of the present invention comprises a quality information management system including one or more computers operably programmed and configured to receive data representing a fault-failure mode relationship, the relationship having one or more levels, each level having one or more elements representing a potential fault in a product or process, receive input linking one or more data objects associated with one or more online documents with one or more of the elements, the online document(s) including information relating to the elements, receive input linking the one or more data objects with one or more sets of measurement data, receive input representing a user-defined query relating to an improvement opportunity for a product or process, query the data representing a fault-failure mode relationship and the data objects to locate one or more data objects matching the user-defined query, automatically associating the matching data objects to the one or more sets of measurement data, and display content of the matching data objects together with the associated measurement data.

Another embodiment of the present invention comprises a quality information management system including one or more computers operably programmed and configured to receive input defining a plurality of sites within a business enterprise, receive input from a first site including a first item of online documentation wherein other sites cannot access the first item without being granted access to the first item by the first site, receive input from the first site granting access to the first item of online documentation to a second site, grant the second site access to the first item of online documentation wherein the access is granted without identifying the first site, receive input from the second site requesting a change to the first item of online documentation, and transmit the request to change the first item of online documentation to the first site wherein the request is transmitted without identifying the second site.

The system may be programmed and configured to receive input linking one or more other items of online documentation to the first item of online documentation wherein the other items of online documentation may be selectively displayed.

The system may be programmed and configured to receive from a first user a draft revision to an item of online documentation wherein the draft revision is automatically solicited to other users specified by the first user.

Another embodiment of the present invention comprises a quality information management system including one or more computers operably programmed and configured to receive input identifying one or more processes associated with a first product, each process having one or more associated online documents with one or more data objects including content, receive input selecting one or more of the processes to be associated with a second product, and automatically create one or more online process documents associated with the second product based on the process selection, those online process documents including the same data objects and content as the online documents associated with the selected process(es). A change to online document content related to a selected process associated with the first product may be automatically reconciled with the online document content associated with the second product.

The system may be programmed and configured to receive input changing online document content related to a process associated with the second product, and in response to a user input, automatically reset the changed online document content to match the online document content related to the selected process associated with the first product.

The system may be programmed and configured to receive input associating one or more processes with the second product that were not processes associated with the first product.

Preferably, these and other embodiments and features of the present invention are implemented in an online fashion based on a client-server architecture. Client-server communication may be facilitated or otherwise supported by corporate intranet (e.g., LAN) and/or the Internet including the World-Wide-Web.

Still further features, objects and advantages of the present invention will become readily apparent to those in the field of art to which the invention pertains upon reference to the following detailed description, drawings and claims.

BRIEF DESCRIPTION OF THE DRAWINGS

FIG. 2 is an example schematic comparing two hypothetical enterprises that an administrator might define within the EwQMS;

FIG. 3 is a block flow diagram illustrating a preferred methodology for setting up certain EwQMS features (sites, entities, users, etc.) within an enterprise, in accordance with one embodiment or aspect of the present invention;

FIG. 15 is an example GUI for establishing linkages such as those referenced in FIG. 14 in accordance with one embodiment or aspect of present invention; and FIG. 16 is a block flow diagram illustrating a preferred implementation of process knowledge management in accordance with one embodiment or aspect of present invention.

DETAILED DESCRIPTION OF THE PREFERRED EMBODIMENT(S)

Overview of the EwQMS

Figure 1:
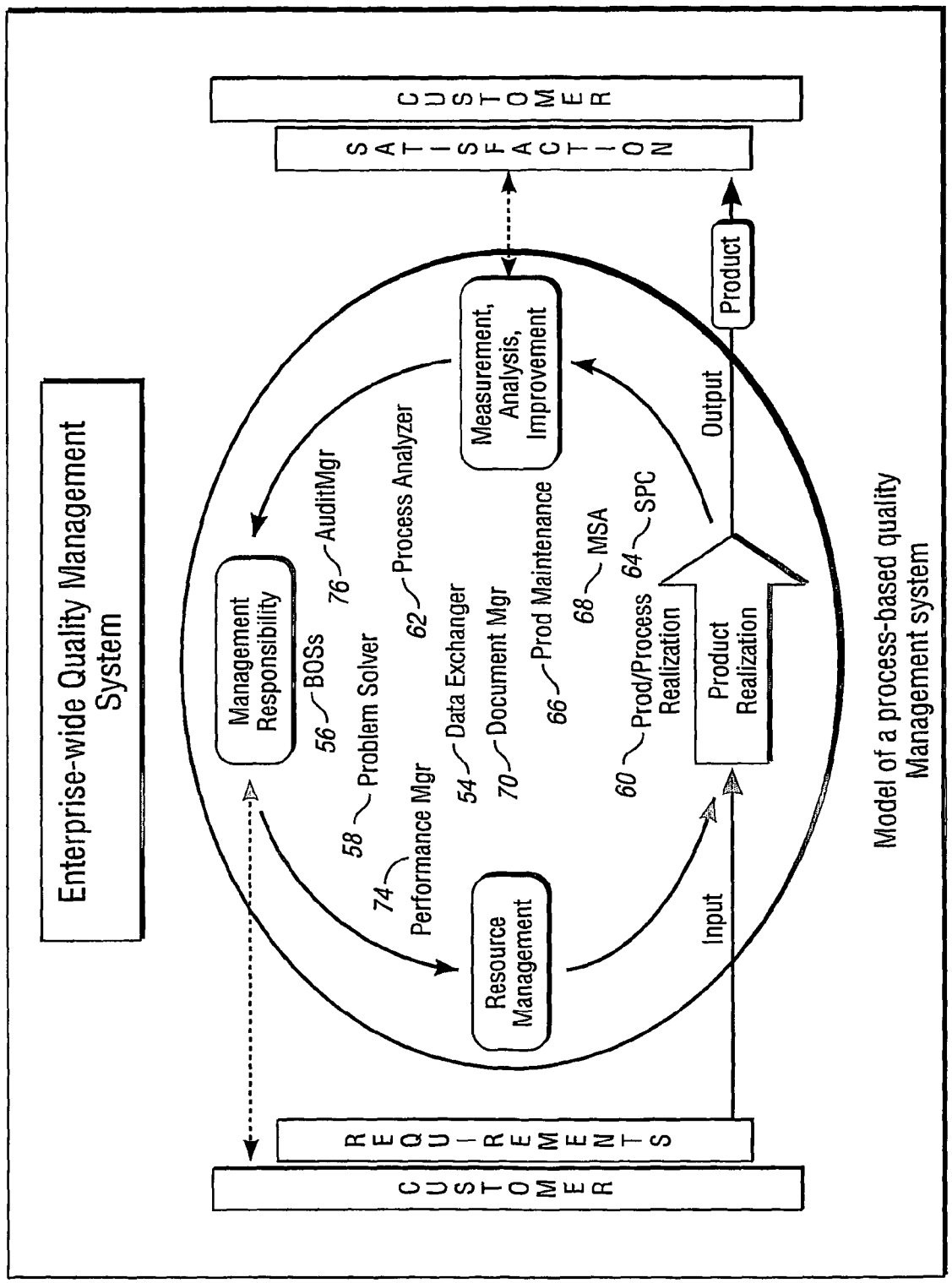
FIG. 1 is a model of a process-based quality management system (e.g., TS 16949:2002 and ISO 9000:2000) including an example of how various aspects of an Enterprise-wide Quality Management System ("EwQMS" may be associated and/or implemented, in accordance with one embodiment or aspect of the present invention.

FIG. 1 is a model of a process-based quality management system (e.g., TS 16949:2002 and ISO 9000:2000) including an example of how various aspects of the EwQMS (described in greater detail below) may be associated and/or implemented in accordance with one embodiment or aspect of the present invention. Notably, associations between the quality management system and EwQMS modules shown in FIG. 1 may be adapted or modified to best-fit a particular implementation of the present invention. In addition, those of ordinary skill in the art will recognize that features of the present invention may be implemented to support a wide variety of other business and quality system structures (e.g., QS 9000, ISO 14000, VDA 6.1 etc.).

More specifically, functionality supported by the EwQMS may be generally referenced by or "divided" into different modules including but not limited to those referenced in Table 1. Table 1 additionally provides a non-exclusive summary of functionality that each module provides.

TABLE 1

| Ref. | Module | Summary |
|---|---|---|
| 70 | Document Manager | Manages and controls online documents in any data format. |

TABLE 1-continued

| Ref. | Module | Summary |
|---|---|---|
| | | Manages and controls online document/revision feedback and approval process, including automatic e-mail notification and escalation. Security can be set at user-defined levels of granularity (e.g., site, group, individual, etc.). Manages and controls user-defined linkages among documents, including content-based linkages. Documents can be aggregated among an unlimited number of user-defined levels - each with their own user-defined security controls. User functionality and menu options are limited based on user rights and privileges. Limitations are transparent to the user. User specified display of preferred documents in table of contents menu. Administrator specified language interface (tags) for each user (any computer displayable language). Provide dynamic linkage to current documents from any other module. |
| 60 | Product/Process Realization | Develops and maintains documents relating to the product and process development cycle (e.g., Advanced Product Quality Planning process, etc.). Maintains user and system-defined linkages among related product realization documents. Supports multiple user-defined formats for each document type. Flexibly filters and sorts documents according to a user-defined specification based on any document content. Highlights changes (e.g., revisions, additions, deletions, etc.) in documents based upon user-specified dates. Links table entries according to different levels of user-defined scope (e.g., global, family, product, etc.) Supports multiple ways of creating products (i.e. sets of product and process documents): Create a new product from scratch Create an independent product by copying the content of an existing product Links a new product to an existing product as a template such that changes in the template may be reflected in the new product Links the process documentation of a new product using subsets of process steps from existing products such that changes in the existing products used may be reflected in the new product Links specific process document content to document content maintained by other modules (e.g., gages which are maintained by the Measurement System Analysis module). Compliant with the automotive industry's FMEA and PPAP manuals. |
| 68 | Measurement System Analysis | Maintains, analyzes and controls variables and attribute measurement systems: Enables a user to conduct bias, linearity, stability, and gage repeatability and reproducibility studies Determines the uncertainty related to a specific measurement system and traceability chain Supports a wide variety of graphical analyses Manages calibration activities including |

TABLE 1-continued

| Ref. | Module | Summary |
|---|---|---|
| | | automated e-mail notifications. |
| | | Compliant with the automotive industry's measurement systems manual. |
| | | Links specific process document content to document content maintained by other modules (e.g., products which are maintained by the Product/Process Realization module). |
| 66 | Productive Maintenance | Manages and controls preventive and reactive maintenance activities. |
| | |     Maintains a historical record of maintenance activities |
| | |     Automatically issues preventive maintenance work orders |
| | |     Supports the creation of reactive maintenance work orders |
| | | Analyzes the reactive maintenance activities and causes of failure (e.g., mean time between failure, mean time to repair, cause of failure, etc.). |
| | | Links specific process document content to document content maintained by other modules (e.g., products which are maintained by the Product/Process Realization module). |
| 56 | Business Operating Systems | Enables a user to develop and maintain/manage linkages among customer expectations, business strategies, processes, and product and process metrics. |
| | | Manages the continual improvement process. |
| | |     Meeting scheduling and management including automatic e-mail notification to participants |
| | |     Reporting of meeting minutes to participants through the Document Manager |
| | |     Maintains links to improvement proposals and improvement proposal ratings |
| | | Maintains links to the problem solving documentation maintained by the Problem Solver module. |
| | | Maintains links to visual analysis (e.g., drill-down analysis functionality) and power tracker functionality. |
| 76 | Audit Manager | Manages and enables enterprise-wide audit activities |
| | |     Supports any type of audit (e.g, standard based, financial, safety, environmental, housekeeping, etc.) |
| | |     Audit scheduling and management including automatic e-mail notification to participants |
| | |     Flexible audit handler: |
| | |         Provides auditors with forms for documenting audit results |
| | |         Provides auditees with audit results and forms to document non-conformance resolutions |
| | |         Provides auditors with capability to close out an audit (e.g., after submission of an auditee's corrective action reports) |
| | |         Provides auditor with online assistance in developing a standard audit report |
| | |     Generates wide variety of management reports based on audit results (e.g., filtered by auditor, nonconformance-type, element, etc.) |
| | | Maintains links to the problem solving documentation maintained by the Problem Solver module. |
| | | Maintains links to visual analysis (e.g., drill-down analysis functionality) and power tracker functionality. |
| 74 | Performance Manager | Manages and enables enterprise-wide training activities: |
| | |     Supports any type of training (e.g., in-house, contract, web-based, etc.) |
| | |     Training scheduling and management including automatic e-mail notification to participants |
| | |     Training evaluation: pre-test, post-test, and satisfaction evaluations |
| | | Supports personal development planning and competency evaluation. |
| | | Customer and employee satisfaction survey development and analysis. |
| | | Enables the development and maintenance of an organization chart by site, including indirect reporting. |
| | | Maintains links to visual analysis functionality (e.g., drill-down analysis, etc.). |
| 64 | SPC | Maintains and analyzes variables and attribute process data: |
| | |     Enables a user to conduct stability, capability and performance studies |
| | |     Determines the statistics related to specific product and process characteristics |
| | |     Supports a wide variety of graphical analyses |
| | | Manages the control and analysis activities including automated e-mail notifications. |
| | | Compliant with the automotive industry's statistical process control (SPC) manual. |
| | | Links specific process document content to document content maintained by other modules (e.g., products which are maintained by the Product/Process Realization module). |
| 62 | Process Analyzer | Enables the development, maintenance and use of user-defined fault-failure mode relationships. |
| | | Links real-world data (e.g., from the SPC module, the Data Exchange Manager module, etc.) to related document content. |
| | | Enables users to query process documents to obtain a subset of document content related to an improvement opportunity. |
| | | Displays document content linked with corresponding real world data. |
| | | Supports user-defined linkages to problem solving forms maintained by the Problem Solver module. |
| 58 | Problem Solver | Enables the development, maintenance and use of system or user-defined problem solving forms. |
| | | Maintains linkages to other EwQMS modules (e.g., Process Analyzer, Business Operating Systems, Audit Manager, etc.) |
| | | Links specific problem solving document |

TABLE 1-continued

| Ref. | Module | Summary |
|---|---|---|
| | | content to document content maintained by other modules (e.g., products which are maintained by the Product/Process Realization module). |
| 54 | Data Exchange Manager | Enables the development, maintenance and use of system or user-defined linkages between EwQMS document content and data maintained by non-EwQMS programs. Importing data into EwQMS according to user-specified timing Exporting EwQMS data to user-specified non-EwQMS databases according to user-specified timing |

Site and Entity-Based Enterprise Architecture

In accordance with one embodiment or aspect of the present invention, an administrator characterizes an enterprise within the EwQMS in terms of "sites" and "entities."

A "site" may be defined as those tangible parts of an enterprise having administration of local processes and documentation. Often, sites are defined geographically (e.g., individual plants, campuses, regions, etc.).

An "entity" may be defined as the business organization or architecture of an enterprise. Notably, an entity may cross one or more sites within an enterprise as well as include representation outside of the enterprise (e.g., customers, suppliers, distributors, etc.). For example, a business unit responsible for a particular line of automobiles (an "entity") within the automotive industry might include elements from (i) the corporate "site" (e.g., engineering development), (ii) one or more manufacturing "sites" and (iii) one or more assembly "sites." These sites could be distributed across multiple geographic regions including countries and continents.

To characterize an enterprise, an administrator defines the enterprise sites and entities. FIG. 2 is an example schematic comparing two hypothetical enterprises that an administrator might define within the EwQMS. Enterprise 10 consists of an international corporation 12 having three business units 14a-14c. Business unit 14a has plants A, B and C in country X. Business unit 14b has plants D and E in countries Y and Z, respectively, and business unit 14c has a single plant F in country Z. Enterprise 10 can be defined within the EwQMS as having six enterprise-wide "sites".

In contrast, enterprise 16 consists of a domestic corporation 18 having a single campus with three business units 22, 24 and 26. This enterprise can be defined within the EwQMS as having a single "site."

In comparing the example enterprises 12 and 16 shown in FIG. 2, it is evident that the EwQMS may be flexibly implemented to support and manage the unique needs and architectures of any number of diverse enterprises.

FIG. 3 is a block flow diagram illustrating a preferred methodology for setting up certain EwQMS features (sites, entities, users, etc.) within an enterprise. After installing and initializing the EwQMS application, as represented in block 28, an administrator provides input to the EwQMS defining sites within the enterprise, as represented in block 30. There is no limit to the number of sites that an enterprise may possess. Next, as represented in block 32, the administrator defines entities within the enterprise. Notably, entities may have sub-entities associated with them creating an entity hierarchy. For example, an entity may be associated with a customer, and sub-entities could be specific product lines for the enterprise, which that customer purchases. Like sites, there is no limit to the number of entities that an administrator may define.

As represented in block 34, the administrator next defines EwQMS users. User definition includes demographic information, contact information, username, password as well as a site and entity association for the user.

Once a user account is properly defined within the EwQMS, that user can then access certain information and functionality supported by the EwQMS. In a preferred embodiment, the information and functionality that a user has access to is controlled within the EwQMS by the site and entity that user has been associated with. However, an administrator may limit or expand user access and functionality rights with respect to any information or functionality supported by the EwQMS.

Decentralized Document Management and Administration

Typically, an enterprise includes processes that span multiple sites (e.g., corporate, business unit, plant, etc.). Some processes are defined and utilized at multiple sites, while others may be defined and utilized by only a single site. More specifically, a particular site can administer and manage documentation associated with his or her site-specific processes. However, where a particular process covers more than one site, one of those sites is considered to be the "owner" of the documentation relating to that process. If a process only applies to a single site, that site is considered the "owner" of the documentation relating to that process.

In the case of a process that transcends multiple sites, the "owner" of the process documentation grants the other sites access to that documentation. Notably, an individual user is provided access to that documentation in a fashion that is transparent of the owning site. Consequently, a user may have access to documentation comprising process documentation originating from that user's site as well as process documentation originating from other sites (over which a multiple-site process transcends). The actual location or "owner" of the process documentation, however, will be transparent to that user.

Figure 4:
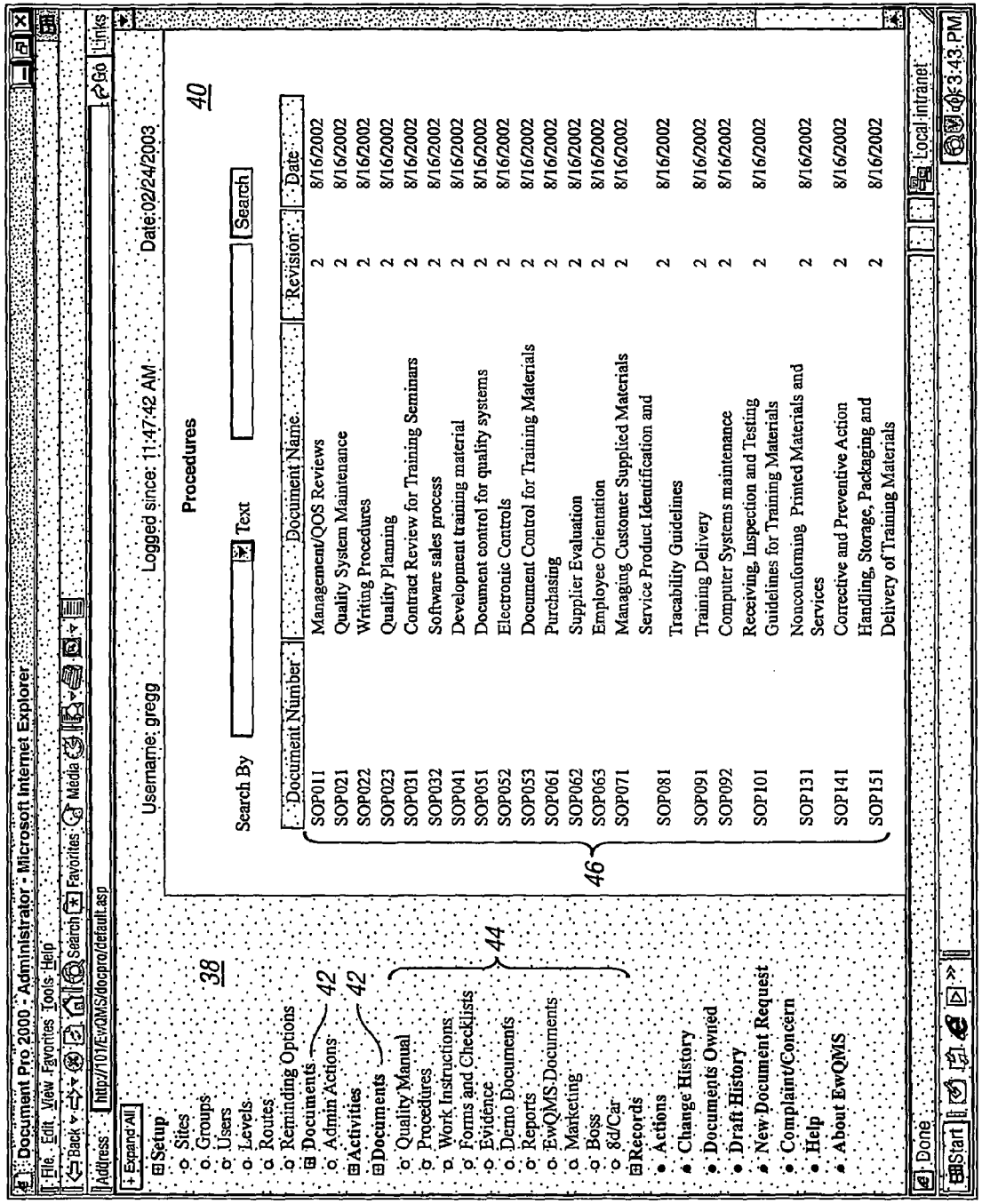
FIG. 4 is an example GUI for accessing authorized documents from among a plurality of administrator-defined levels or categories, transparent of the source of those documents in accordance with one embodiment or aspect of the present invention.

FIG. 4 illustrates an example of this aspect of EwQMS. FIG. 4 is an example GUI 36 having a menu region 38 and a data input/presentation region 40. The "Documents" menu item 42 enables a user to select authorized documents from among a plurality of administrator-defined levels or categories 44 (e.g., quality manuals, procedures, work instructions, etc.). An administrator may define an unlimited number of document levels. By selecting document level "Procedures" for example, a user is presented with a table of contents 46 including a plurality of procedure documents to which that user has been granted access. Notably, these documents may originate from the user's own site, or from other sites within the enterprise. For example, the procedure "SOP011" may be "owned" by or originate from the corporate site, whereas procedure "SOP052" may be "owned" by a manufacturing site. In this regard, the true origination of the document is transparent to the user enabling a site to efficiently utilize other sites' documentation and thereby reduce redundant documentation and ensure consistent knowledge across the enterprise.

Figure 5:
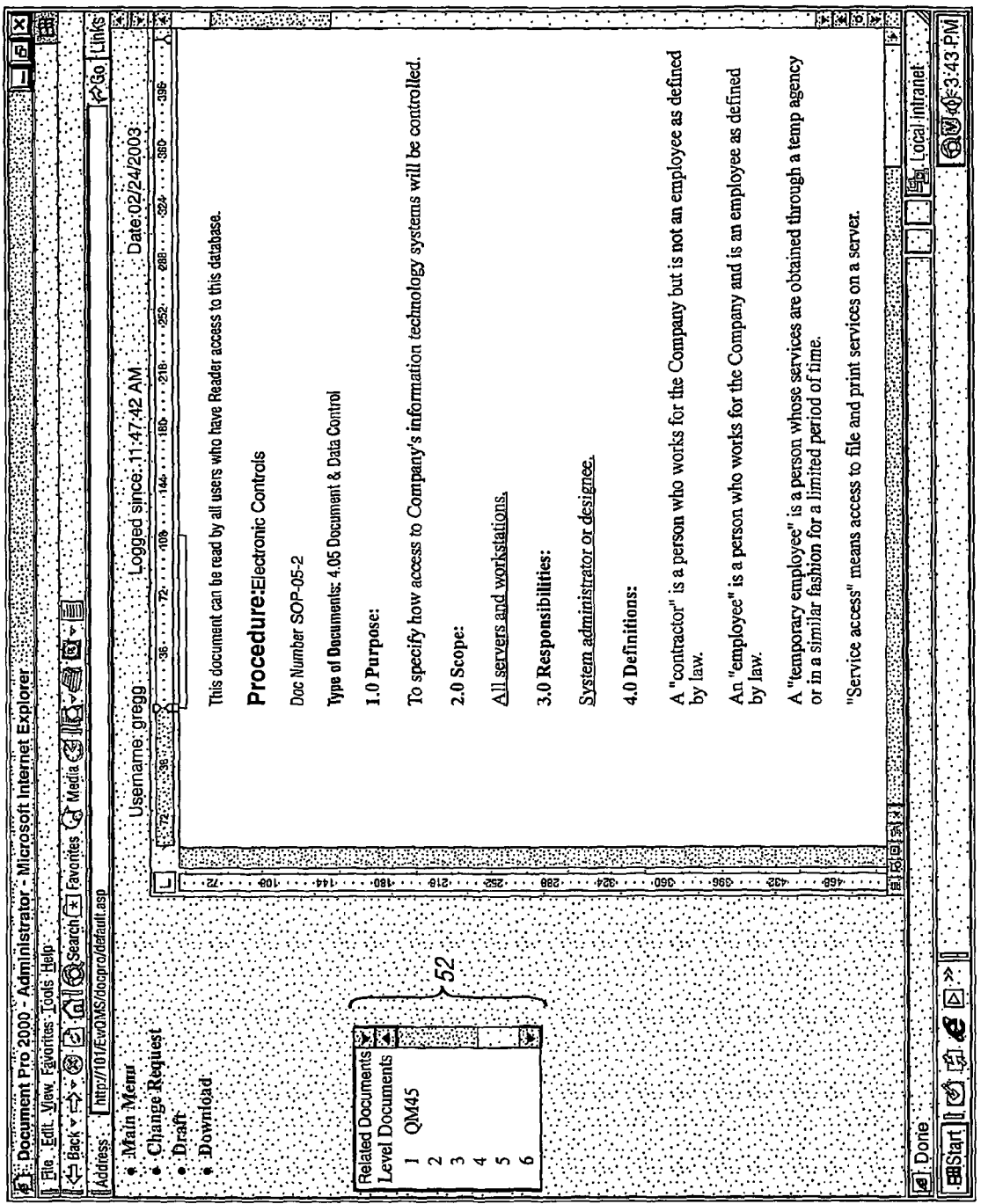
FIG. 5 is an example GUI for viewing and maintaining authorized documents in accordance with one embodiment or aspect of the present invention.

Upon selecting a particular document ("SOP052"), a user may be presented with a GUI 48 such as that illustrated in FIG. 5. Functionality provided to the user includes the ability to view the document, submit a request to the document "owner" to modify or delete the document, solicit a draft revision to selected users for comment, and download the document. Additionally, a user can view and access documents that are related (i.e., "linked") to the current document via menu 52. Preferably, related documents are displayed according to their document level.

Notably, functionality such as that shown in FIGS. 4 and 5 is provided to a user without reference to or limitation by the site that "owns" the document. In this regard, the true origination of the document is transparent to the user enabling a site to efficiently utilize other sites' documentation and thereby reduce redundant documentation and ensure consistent knowledge across the enterprise.

Data Sharing Between Entities and Sites

Typically, an enterprise maintains a wide variety of data across several business functions (e.g., human resources, manufacturing activities, inspection and testing activities, continual improvement activities, etc.). However, data associated with one of these activities may not be unique to that activity, and may overlap with others within the enterprise. In this regard, as aspect of the EwQMS enables data sharing between sites and entities to reduce redundant data entry and ensure consistent knowledge across the enterprise.

Figure 6:
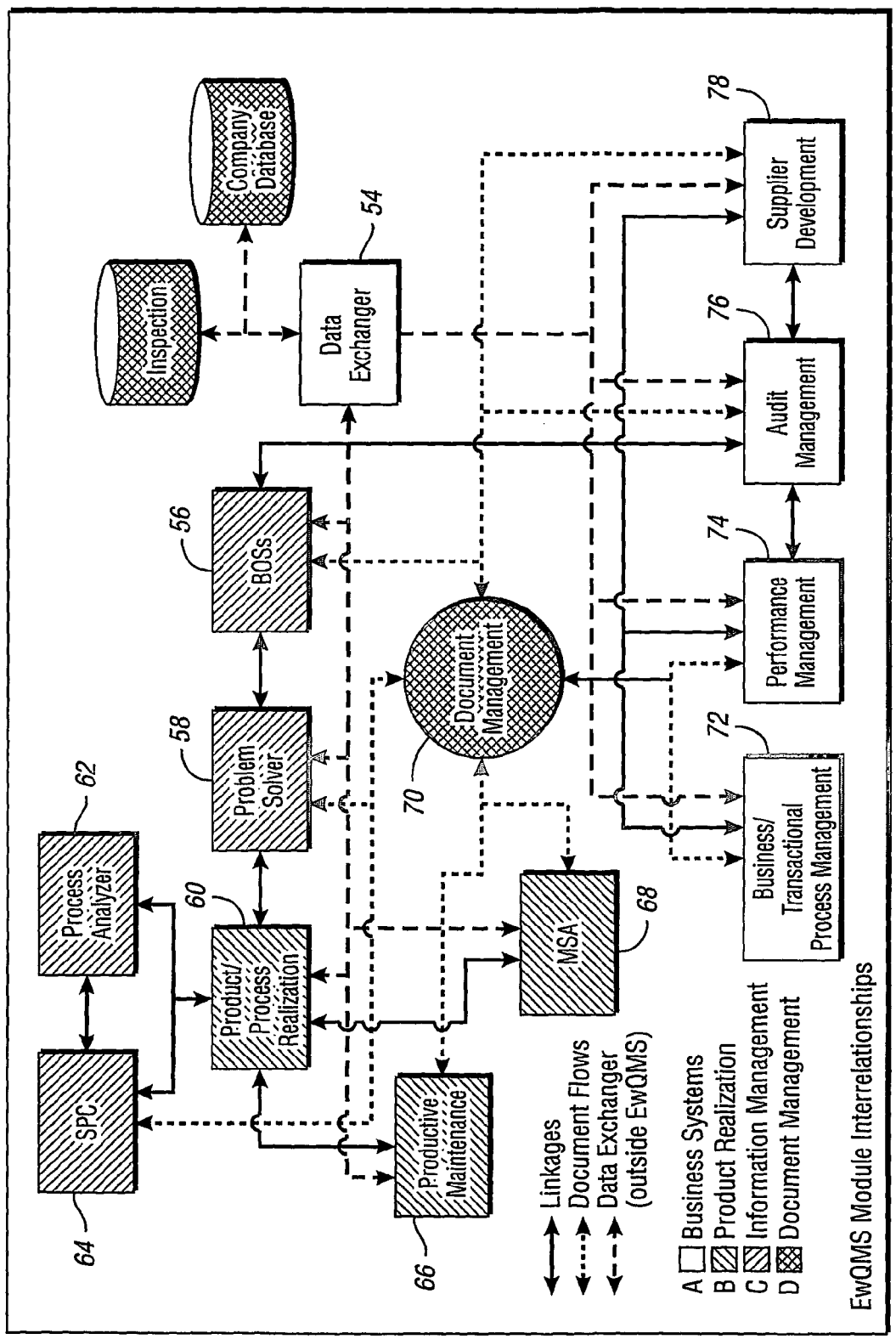
FIG. 6 is a schematic illustrating an example implementation of EwQMS modules within an enterprise in accordance with one embodiment or aspect of the present invention.

FIG. 6 is a schematic illustrating an example implementation of EwQMS modules within an enterprise. Notably, the content or arrangement of FIG. 6 may be adapted, reduced or expanded to best-fit a particular implementation of the present invention. Table 1 lists and generally describes the function of each EwQMS module.

Linkages between EwQMS modules 54 through 78 may be generally divided into three categories: core interrelationships (denoted by solid lines 84), document flows (denoted by short-dashed lines 80) and data exchange (denoted by long-dashed lines 82).

The data exchanger module 54 enables EwQMS to share data with non-EwQMS applications (e.g., "legacy" systems, enterprise resource planning systems, etc.) in an effort to reduce redundant data entry and ensure consistent knowledge across the enterprise.

Figure 7:
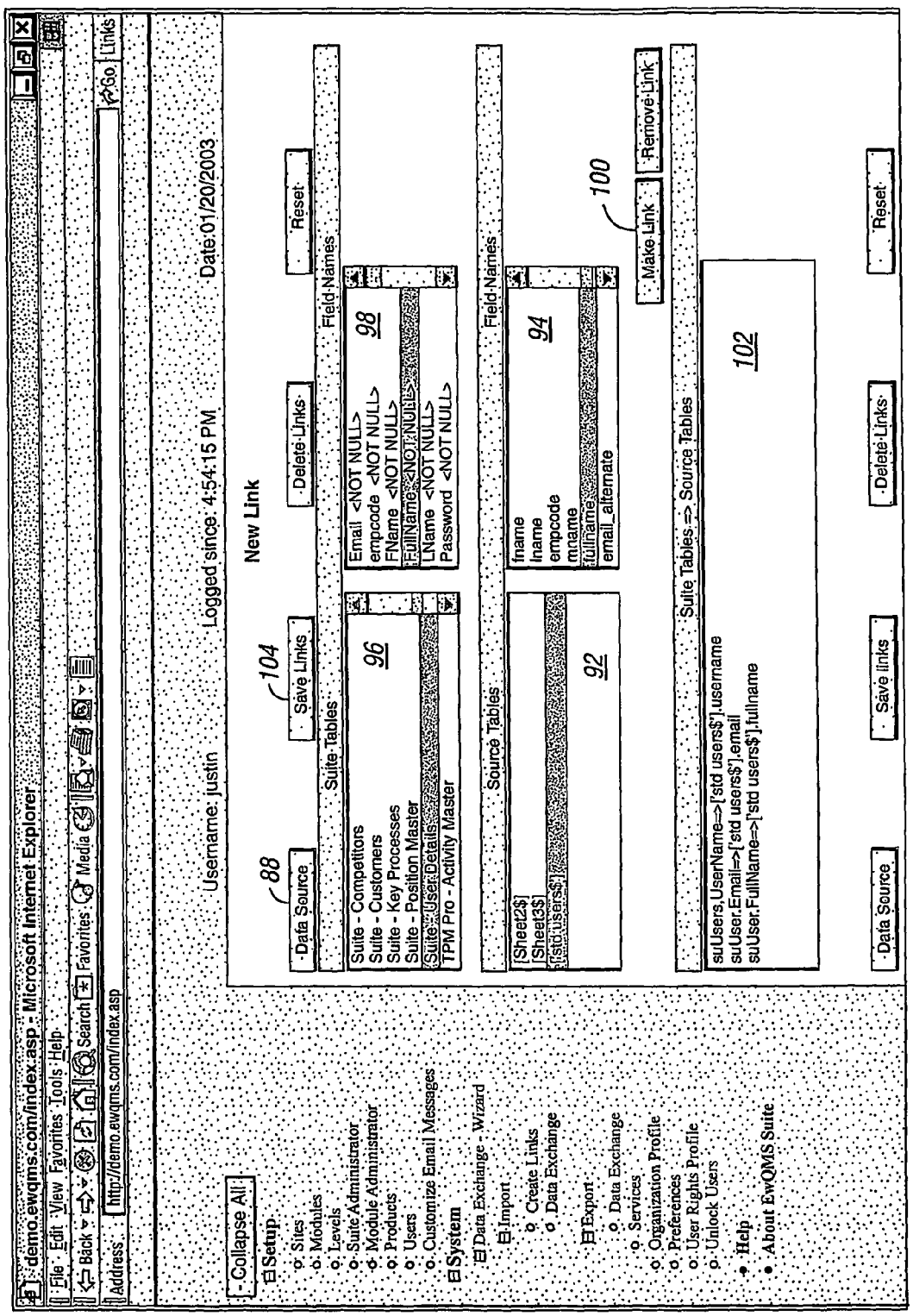
FIG. 7 is an example data exchanger GUI for creating links between EwQMS data tables and external data in accordance with one embodiment or aspect of the present invention.

FIG. 7 is an example data exchanger GUI 86 for creating a link between EwQMS data tables and external data. To initiate a new link according to this example, a user selects the "Data Source" button 88 and is presented with pop-up GUI 90 illustrated in FIG. 8. Through GUI 90, the user specifies the connection between the EwQMS data tables and external data (e.g., connection type, driver, database, username, password, etc.). Next, the "Source Tables" region 92 is populated. Upon selecting a source, the "Field Names" region 94 is populated. The user performs the same method with respect to the "Suite Tables" 96 and "Field Names" 98. To link a EwQMS field with an external field, the user selects respective fields and depresses the "Make Link" button 100. In response, the EwQMS establishes the data link as shown in region 102. When a link is successfully defined, a user selects the "Save Links" button 104 to finalize the link.

Figure 8:
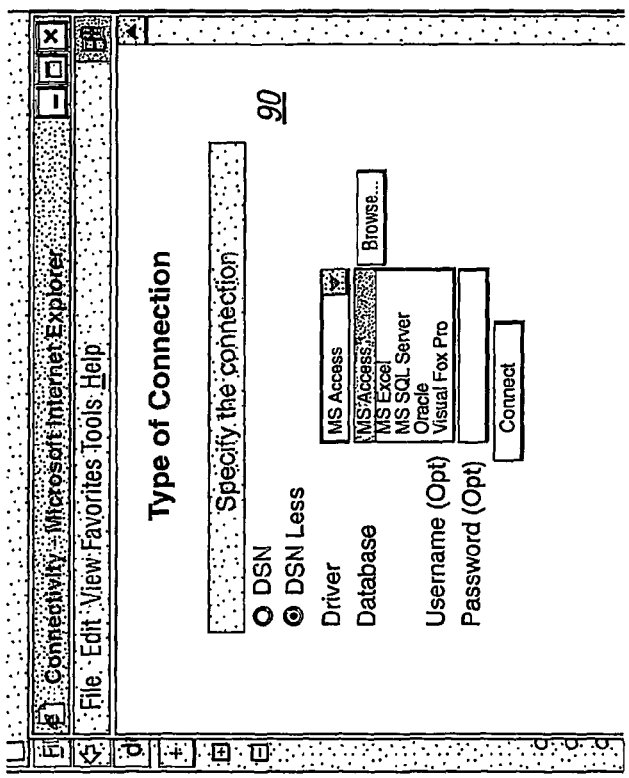
FIG. 8 is an example GUI for specifying a connection between EwQMS data tables and external data in accordance with one embodiment or aspect of the present invention.
Figure 9:
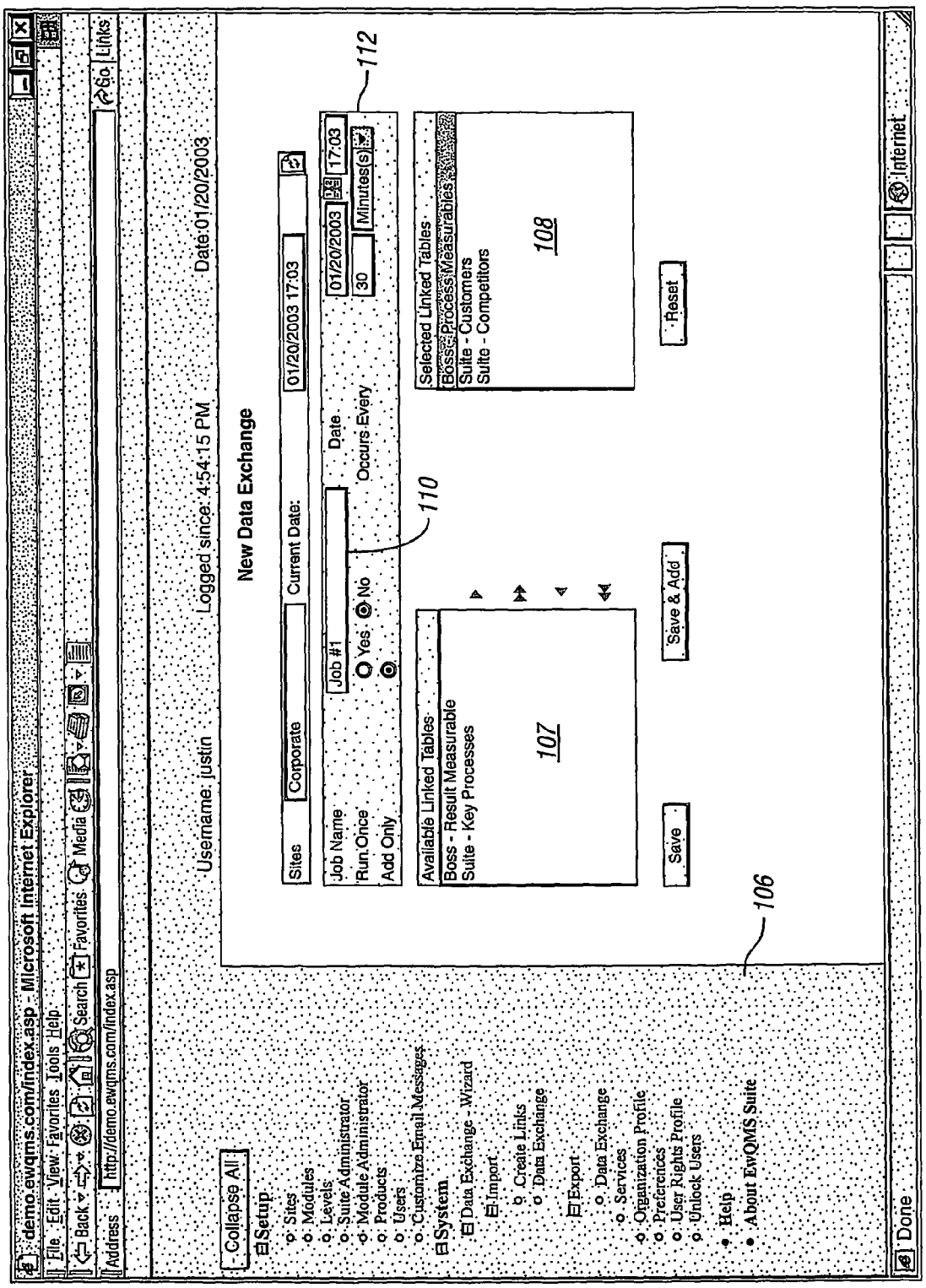
FIG. 9 is an example GUI for executing the data exchange within the EwQMS based upon the defined links (see FIGS. 7 and 8) in accordance with one embodiment or aspect of the present invention.

FIG. 9 is an example GUI 106 for executing the data exchange within the EwQMS based upon the defined links (see FIGS. 7 and 8). To execute a data exchange, a user selects one or more linked tables within region 107, transferring them to region 108. The user also inputs a job name 110 and a start time and execution frequency 112.

Notably, the data exchange process described with respect to FIGS. 6-9 may be implemented with respect to any of the EwQMS modules (see Table 2).

Enterprise-Wide Business Operating System Linkages

Within an enterprise, logical interrelationships exist or should be defined among business strategies, actions for realizing those strategies, and related documentation. The EwQMS captures and utilizes these interrelationships in enterprise-wide manner to (i) define and maintain a constancy of purpose in achieving goals of the business strategy, and (ii) reduce error and effort (i.e., redundancy) in developing and administering documents related to achieving those goals within an enterprise.

Figure 10:
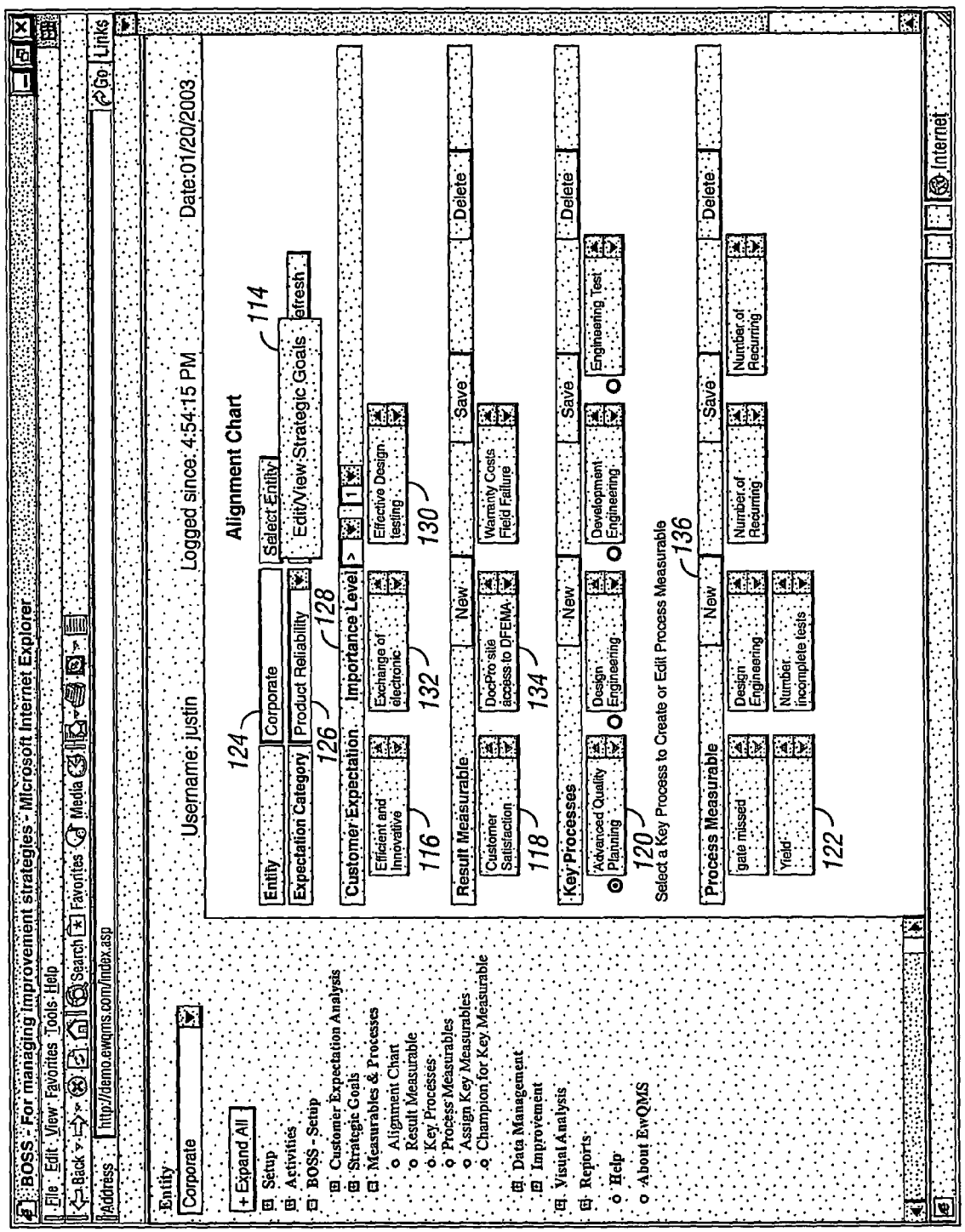
FIG. 10 is an example GUI for defining categories of customer expectations and linking those customer expectations with result measurables, key processes, and process measurables in accordance with one embodiment or aspect of the present invention.

As shown in FIG. 10 for example, the EwQMS enables a user to define categories of customer expectations 126 and link customer expectations 116, result measurables 118, key processes 120 and process measurables 122 to those categories in an online fashion.

In one embodiment, a user may define and use an "Alignment Chart" by inputting or otherwise selecting an "Entity" 124. An "Expectation Category" 126 is selected from a pull-down list of user-defined categories of customer expectations. An "Alignment Chart" for the selected "Expectation Category" is then displayed. This chart consists of the "Customer Expectations" 116, "Result Measurables" 118, "Key Processes" 120, and related "Process Measurables" 122.

The user can restrict the display to only those "Customer Expectations" which satisfy logical constraints determined by pull-downs 128 and 130 (e.g., an "Importance Level" greater than a user-defined value).

The user can also add elements in the "Result Measurables", "Key Processes", and related "Process Measurables" areas by clicking on the respective "New" buttons (132, 134, 136) and either by entering free-text or selecting an element from a table of user-defined result measurables, key processes, or process measurable.

Additionally, a user can input and display strategic goals 114 for achieving the selected expectation category 126.

Figure 11:
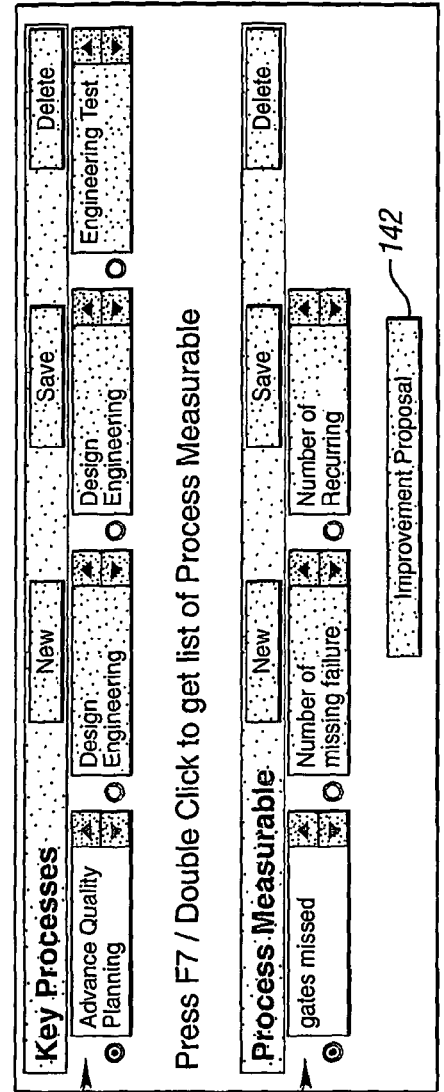
FIG. 11 is an example GUI showing example results when a "key process" of FIG. 10 is selected/changed in accordance with one embodiment or aspect of the present invention.

Entries within the "Process Measurables" area 122 are linked to entries within the "Key Process" area 120. FIG. 11 shows example results when the key process "Advanced Quality Planning" shown in FIG. 10 is selected via radio button 138. The process measurables entry "gates missed" is also selected via radio button 140. This feature of the EwQMS enables a user to initiate online proposals for improving the selected key process (by clicking the "Improvement Proposal" button 142). This feature of the present invention facilitates and manages an enterprise's continual improvement activities. In addition, this feature of EwQMS supports data analysis through a "drill-down" functionality (discussed in greater detail below).

Within EwQMS, business goals and objectives can also be linked to individual employees within an enterprise. This feature of EwQMS ensures constancy of purpose down to a personal or individual level of granularity. In addition, this feature supports employee performance evaluation including recognition (e.g., appraisal and bonus systems), as well as a visual display of an employee's achievement of goals over time (i.e. trends) or at a specific point in time.

Figure 12:
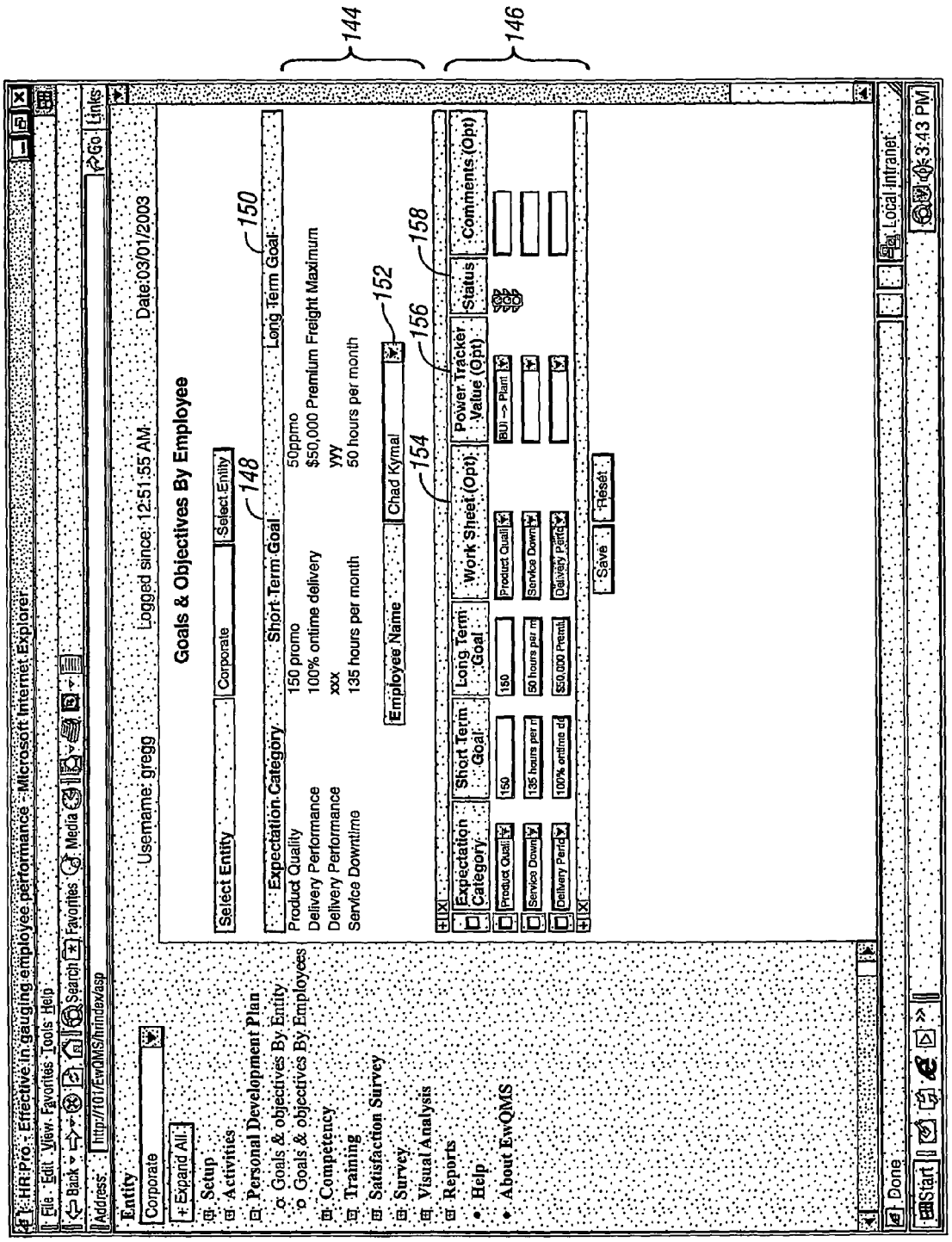
FIG. 12 is an example GUI for defining linkages between entity goals and objectives and individual employee goals for realizing the entity goals in accordance with one embodiment or aspect of the present invention.

FIG. 12 is an example GUI illustrating user-defined linkages between entity goals and objectives 144 and individual employee goals 146 for realizing the goals of the entity 144. The example GUI displays related "Short Term Goals" 148 and "Long Term Goals" 150 for each "Expectation Category" 144. The user then selects an "Employee" 152 and inputs one or more "Short Term Goals" and "Long Term Goals" for any or all of the "Expectation Categories" of the entity. The user can also relate a "Visual Analysis Worksheet" 154 and "Power Tracker Value" 156 to each goal.

A visual analysis worksheet (not shown) receives or otherwise collects data for a particular result or process measurable over time (e.g., trend analysis, pareto analysis, etc.). The worksheet receives numerical data representative of user-defined or user-selected attributes (e.g., quality, cost, delivery, downtime, defect occurrence rates, accident rates, etc.). This data can be manually input or automatically imported into one or more computer databases associated with the EwQMS system. The EwQMS system is provided access to this information for purposes of data processing, analysis and display, as described in greater detail herein.

A power tracker may be implemented to evaluate the product or process measurable with respect to the short and/or long term goals for a specific time or time period. A status indicator (e.g., stoplight icon 158) may visually reflect the extent to which the employee has achieved the corresponding goal(s).

Figure 13:
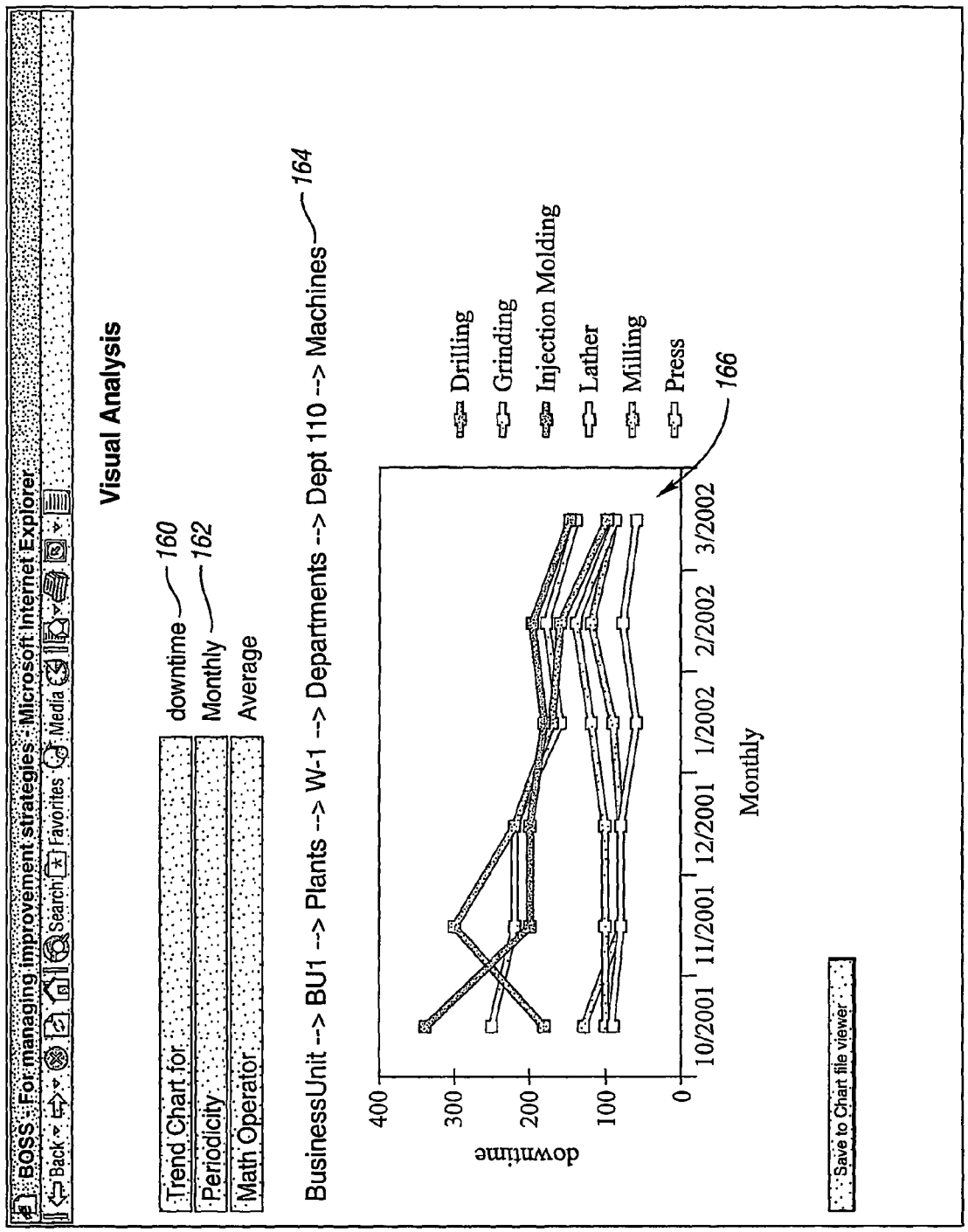
FIG. 13 is an example GUI providing a visual analysis according to linkages such as those referred to with respect to FIG. 10 in accordance with one embodiment or aspect of the present invention.

Another feature that EwQMS supports is linkage-based visual data analysis and reporting. Utilizing this feature of the present invention, a user can quickly and visually "drill down" through graphical data displays according to user-defined linkages such as those referred to with respect to FIG. 10. FIG. 13 is an example GUI illustrating this feature of EwQMS. More specifically, a "Visual Analysis" is provided for a user-defined and selected measurable (e.g., "downtime" 160) over a user-defined period of time and periodicity (e.g., "monthly") 162. A path 164 of aggregation levels for the Visual Analysis is provided demonstrating to the user various levels of granularity among the relevant data.

In accordance with a preferred embodiment of the Visual Analysis feature of EwQMS, a user may interactively "drill down" into aggregation levels by selecting a data feature (e.g., line, legend item, bar, etc.) on the displayed graphic 166 (e.g., line graph, bar graph, pie chart, pareto chart, etc.). Based upon the user-defined linkages, the application gathers the appropriate quantitative or qualitative data into data objects. The data features displayed are surrogates for or representative of these data objects. When the user selects one of the data features, the system automatically utilizes entity and/or linkage information associated with the data object to create a new analysis or display. In this fashion, the EwQMS application automatically and programmatically processes the result measurable data and the process measurable data. This data processing maybe implemented based on a descriptive or statistical analysis of the result measurable data and the process measurable data.

In a Web-based implementation of the EwQMS, a user may "drill up" by selecting the "Back" button within the user's Web browser. Notably, other methods for drilling into or out of aggregation levels may be provided (e.g., zoom-in, zoom out, etc.).

Enterprise-Wide Document Content Linkages

Within an enterprise, logical interrelationships exist or should be defined among business document content (e.g., quality documents, engineering documents, process documents, maintenance procedures, work instructions, etc.). The EwQMS captures and utilizes these interrelationships in enterprise-wide manner in an effort to reduce redundant data entry and ensure up-to-date and consistent knowledge across the enterprise.

More specifically, EwQMS implements linkages between online document content, or sections of content, such that information entered into certain portions of one document automatically propagates to or reconciles with appropriate portions within other documents that use or include the same type of information. Notably, this propagation or reconciliation of content is dynamic in that, according to one embodiment, the user can enter the information from any of the documents that contain it. The user is not constrained necessarily to a specific path of information entry or document development. This approach minimizes redundant data entry and reduces the risk that related documents will have different revision levels of the same data.

Figure 14:
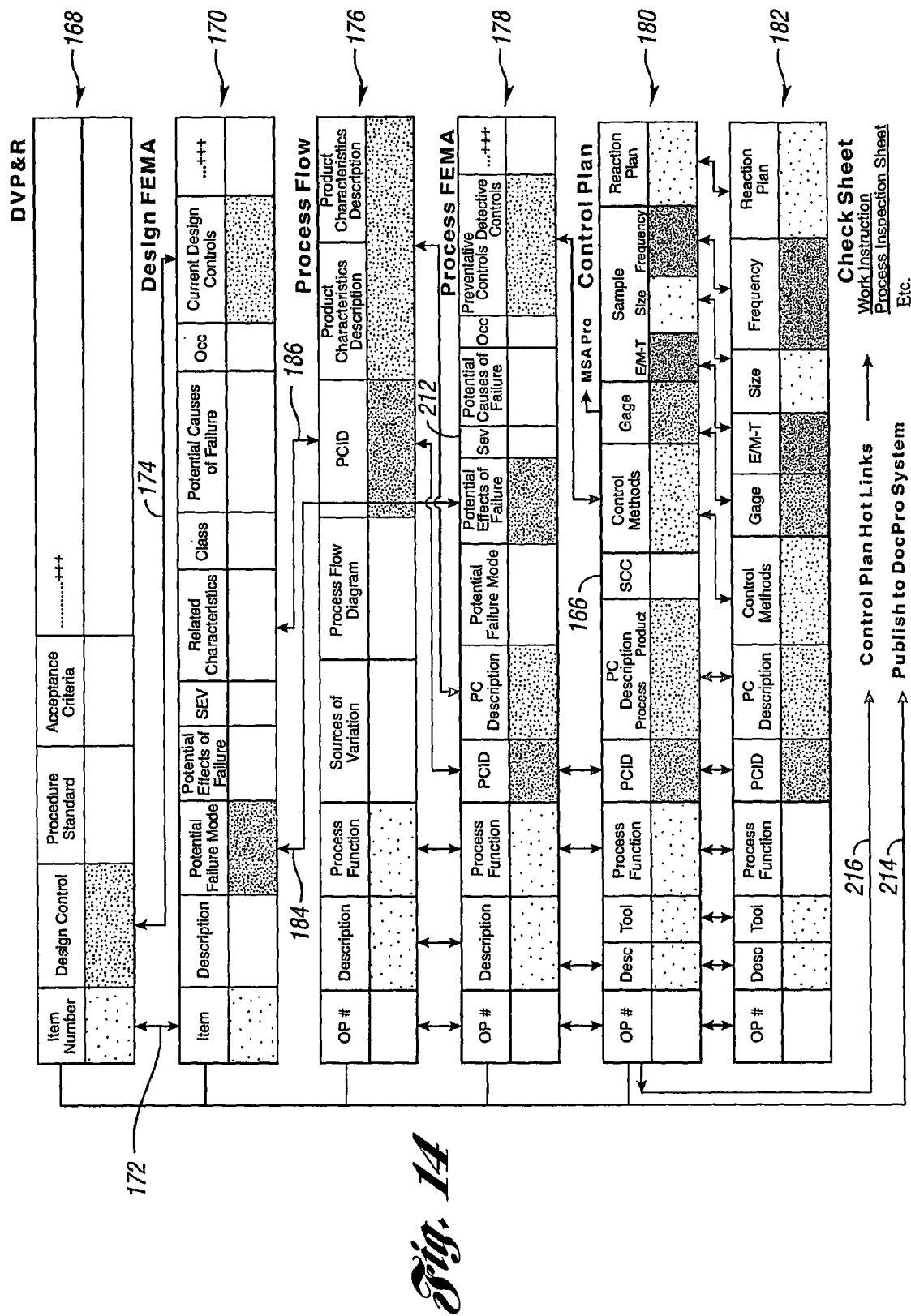
FIG. 14 is a schematic illustrating an example set of content linkages among a plurality of business documents in accordance with one embodiment or aspect of the present invention.

FIG. 14 is a schematic illustrating an example set of content linkages among a plurality of business documents. In the example shown in FIG. 14, the business documents relate to "product realization." However, linkages among business document content may be established within EwQMS for a wide variety of other document categories (e.g., quality documents, engineering documents, process documents, maintenance procedures, work instructions, etc.).

In particular, FIG. 14 displays example content linkages among various documents generated during product realization activities. For example, design verification planning and reporting ("DVP&R") 168 and design failure mode and effects analysis ("DFMEA") 170 are documents that are typically generated during the design phase of the product realization process. Linkages 172 and 174 ensure that information (i.e. item number and design control, respectively) that are input by a user into the DFMEA 170 is automatically reflected in appropriate sections of the DVP&R 168, and visa-versa. This feature of the EwQMS reduces or eliminates the need for redundant data entry in documents having common content. As a result, this feature minimizes user error and ensures that all users of the EwQMS are provided with consistent and up-to-date information.

Linkages may be established between any online document content item (e.g., cell within a control plan) and any other online document managed by the EwQMS. For example, a user may link a particular cell within a control plan to the related work instruction document or process inspection checksheet or form. In an example embodiment, an online document or form comprises one or more cells of information. Each cell may be represented as a data object within the EwQMS application. Where two or more online documents or forms include or make reference to the same cell or data object, they are programmatically "linked" such that an update or change to one of the cells or data objects within one online document automatically results in a corresponding update or change in the other linked cells or data objects with the other online documents or forms for display to the user.

In another embodiment, a controlled online document or a controlled set of content or data (e.g., policies, procedures, etc.) may be defined and input into EwQMS by administrative or authorized users according to the enterprise-wide entity structure (e.g., FIG. 2). Entities within or associated with the enterprise may access or create their own quality-related online documents or content from scratch or otherwise. Where these documents include or make reference to the controlled content, the EwQMS application programmatically imports the controlled content for display to the user. In this embodiment, EwQMS automatically and programmatically provides a level of online content control for sites within or associated with an enterprise seeking or having access to such content. Via content-based linkages among the data objects containing the controlled content, controlled content may only be defined/updated by those users having proper access/authority according to the enterprise structure. Controlled content is automatically displayed within related online documents available to users having access/authority to view those online documents.

FIG. 14 also displays content linkages among process documentation (e.g., process flow 176, process FMEA 178, control plan 180 and check sheet 182). In addition to reconciling online document content, this aspect of the present invention facilitates the creation of new online documents according to the user-defined linkage paths. Linkages are also provided between the design and process documents. For example, linkage 184 might link a first effect of a process failure mode input into the PFMEA 178 to a design failure mode within the DFMEA 170. This linkage 184 results in the creation of linkage 186, which relates product and process characteristics from the process documents (176-182) to the DFMEA 170. Notably, an unlimited number and arrangement of content linkages may be provided in accordance within the scope of the present invention. Additional linkages 214 may be established between and among EwQMS documentation (e.g., FIGS. 4-6).

According to another aspect of the present invention, online document linkages among one or more document content data objects may facilitate or improve the efficiency of document creation and administration associated with new product development. In instances where the manufacture, assembly or development of a new or "child" product has one or more processes similar to or in common with an existing or "parent" product, user-defined linkages among the common processes results in the automatic creation or reconciliation of a new set of online document content associated with the new product. For example, two products may be produced using similar processes (e.g., milling, machining, plating, assembly), but in a different order. Each process may have the same quality documentation (e.g. failure mode analysis, activity control plan, etc.), independent of the product operated on. The ability to create and organize this process documentation for new products in an automated fashion improves efficiency and saves time.

When a "child" product is created from a "parent" product, the child product may programmatically "inherit" some or all of the parent's process documentation and/or attributes. If any attribute or information in a parent's document is modified, the changes may propagate to related child attributes and documents and to the attributes and documents of the children of the child, and so forth. The information in any of the inherited documents and any attribute can be changed or hidden and subsequently reverted back to the latest (current) parent value.

A user interface may be displayed for associating processes of one product with processes of another product to establish linkages among related online document content. Product-unique process information can be added to documents and inherited documents and attributes can be changed or hidden and subsequently reverted back to the latest (current) state. Additionally, processes and associated documentation may be linked to individual parts of the product.

This aspect of the present invention may be presented to the user in different ways. According to one embodiment, the processes for products are presented in a table format having different members assigned to each process. The order of the processes can be changed by changing the order number of the process to be moved. For example, to move process number 5 to the first process involves changing the value 5 to 1. The application may reorder the processes automatically. Based on linkages among online document content related to the processes, the online documents are automatically created, reorganized or reconciled according to the user-specified process association. In another embodiment, a graphical representation of processes for different products may be "clicked and dragged" to define a process relationship. These changes will automatically be reflected in related documents.

Once the process relationship for a new product is established, the user can change any of the inherited process attributes as well as add new branches to the developed process documents. For example, the user can string together 3 existing processes and add a customer unique process step in the process flow. The user would simply insert a branch at any of the process documents any fill in the appropriate process-related information.

FIG. 15 illustrates an example "pop-up" GUI for establishing such linkages. To establish a link in accordance with this example, a user performs a "right-click" operation over a document cell to obtain the GUI shown in FIG. 15. To associate one or more documents with the cell, the user selects a level 218 and then selects one or more available documents for that level through listing 220. Notably, after establishing such a link, the EwQMS automatically makes available to the user the latest and most up-to-date version of the linked document.

Process Knowledge Management

Based on linkages and interrelationships such as those illustrated and described with respect to FIGS. 6 and 14, the EwQMS enables a user to continually improve products and processes within an enterprise. The EwQMS provides an efficient tool for identifying a concise subset of product and process document content for evaluation by a user (e.g., subject matter expert) in an effort to identify and act upon improvement opportunities.

FIG. 16 is a block flow diagram illustrating a preferred implementation of process knowledge management in accordance with a preferred embodiment of the present invention. Notably, the content or arrangement of FIG. 16 may be modified or adapted to best-fit a particular implementation of the present invention. Activities associated with process knowledge management may be divided into categories including: continual document updating 188, fault tree development 190, improvement opportunity development 192, and improvement opportunity evaluation 194.

Continual document updating 188 includes collecting real world data 196 and linking that data within EwQMS to related documents or portions thereof, as represented in block 198. Linkages may be established in a manner similar to that illustrated and described with respect to FIGS. 6 and 14. For example, product and process characteristics (e.g., characteristic performance—stability and variability metrics including occurrence values in the PFMEA, etc.) may be linked and automatically updated within EwQMS with actual performance results or data available directly through EwQMS suite modules (e.g., SPC, Process Pro, Process Analyzer, Audit Pro, Boss) (FIG. 6) or imported by the suite from external programs (e.g., data entry via handheld device links to a hard gage in the customer's, plant's, or supplier's production facility). Notably, continual document updating should be implemented in on an ongoing basis within an enterprise.

According to another aspect of the present invention, a relationship between fault and failure modes may be developed/defined. This relationship may be defined using an online fault tree, failure mode analysis, cause/effect matrix, etc. For example, a fault tree 202 may be developed/defined 200 in an online fashion and displayed in an org chart graphical format with one or more user-defined levels (e.g., system fault→subsystem fault→component fault→part fault→part characteristic, etc.). Element definition may include a related product number or other identifier that links the element with related online documentation or related data objects in the fashion described above. EwQMS uses (i) these user-defined linkages and (ii) linkages between the user-defined levels and fault tree elements themselves to relate a specific set of product realization and/or other online documentation (e.g., quality documents, engineering documents, process documents, maintenance procedures, work instructions, etc.) to the fault tree 202.

In one embodiment, improvement opportunity development 192 includes periodic management review of result and process metrics (e.g., FIGS. 10-13) in an effort to identify product or process improvement opportunities, as represented in blocks 206 and 204. If an improvement opportunity is identified a user may submit a query to EwQMS relating to the opportunity (e.g., text-based query, fuzzy search, relational query, etc.). In a preferred embodiment, the EwQMS executes the user-defined query relating to an improvement opportunity against the fault tree and linked documentation, as represented in block 210. Query results preferably include a subset of documentation or documentation content.

As represented in block 194, the EwQMS automatically associates the results of the user-defined query with real world data 198 related to those results. For example, process indices such as Cp, Cpk, Pp, Ppk or ppm can be linked to the occurrence rating contained in the PFMEA (see FIG. 14, item 212). This feature of the present invention enables a user (e.g., subject matter expert) to review and identify potential solutions for realizing improvement opportunities both inside and outside of the enterprise (e.g., among suppliers, distributors, customers, etc.).

System Specifications

Preferably, aspects of the present invention are implemented according to a client-server architecture. Those of ordinary skill in the art will recognize, however, that functionality such as that illustrated and described herein may be implemented or otherwise delivered over a variety of other platforms including but not limited to mainframe and stand-alone computing environments. Functionality such as that illustrated and described herein may also be delivered in a source code or object code format embodied in a wide variety of mediums (e.g., CD-ROM, magnetic disc, DVD, online download, etc.).

Table 2 includes recommended technical specifications for a client-server implementation of the present invention.

TABLE 2

|   | Component | Recommended Specifications |
|---|---|---|
| Server | Processor | Intel Pentium-class 1 GHZ or higher |
|   | RAM | 256 MB |
|   | OS Apps | Microsoft Internet Information Server (IIS) SMTP component installed. IIS version 5.0 or later on Windows 2000 (part of 2000 server set-up) |
|   | OS Apps | SQL Server 2000 or later (preferred) ORACLE version possible |
|   | OS/Apps | Microsoft Data Access Components version 2.6 or higher (compatible with selected SQL server) http://www.microsoft.com/Data/download.htm |
|   | Hard Disk | 40 MB (min) |
| Client | OS | Win98/NT/2000/XP or later |
|   | Processor | Pentium-class PC 750 MHZ or higher |
|   | Browser | Internet Explorer 6.0 or later W3C standards compatible with support for client side active X controls (for graphical/hierarchical data display, etc.) SVG viewer http://www.adobe.com/svg/viewer/install/ |
|   | Monitor | 800 × 600 (or better) |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An information management system comprising:
   one or more computers each including a computer processor; and
   a display including one or more interactive graphical user interfaces (GUIs), wherein the computer processors are programmed to:
   (i) receive input from one or more users at one of the GUIs defining an organization associated with a business enterprise;
   (ii) receive input from the user(s) at one of the GUIs defining one or more business expectation(s) for the organization;
   (iii) upon receiving a first input from a user at one of the GUIs, establishing at least a first logical link between one or more result measurable types and one or more of the business expectations, the first logical link correlating at least one measurable type to at least one business expectation to be usable as a measurable for evaluating the business expectation;
   (iv) upon receiving a second input from a user at one of the GUIs, establishing at least a second logical link between one or more processes and one or more of the business expectations, the second logical link correlating at least one process to at least one business expectation to be usable as a process for evaluating the business expectation;
   (v) upon receiving a third input from a user at one of the GUIs, establishing at least a third logical link between one or more process measurable types and one or more of the processes, the third logical link correlating at least one process measurable type to at least one process to be usable as a measurable for evaluating the process;
   (vi) receive input comprising result measurable data and process measurable data corresponding to the result measurable type(s) and process measurable type(s), respectively; and
   (vii) automatically process one or more data objects representing the result measurable data and the process measurable data to generate a visual representation of the result measurable data and the process measurable data, the visual representation including one or more selectable elements, each element corresponding to at least one of the result measurable types, the process measurable types, the processes or the business expectations, wherein the visual representation is user selectable, wherein selection of a selectable element enables a user to drill down through the result measurable data and the process measurable data based on the logical linkages defined in items (iii) through (v), such that data related through logical linkages to the selected selectable element is subsequently displayed upon selection of that element, and further enable the user to drill-up to a higher level of data display through selection of a selectable element or selecting a displayed selectable option, thereby enabling a user to identify and evaluate at least one of a concise subset of product and process document content.

2. The system of claim 1 wherein the business expectations are customer expectations for a product or service.

3. The system of claim 1 wherein an interactive online chart is displayed for defining the entity, defining the business expectation(s), linking the result measurable types to the business expectations, linking the processes to the business expectations, and linking the process measurable types to the processes.

4. The system of claim 3 wherein the interactive online chart is configured to display business expectations which satisfy a user-defined constraint.

5. The system of claim 4 wherein the constraint is an importance level.

6. The system of claim 1 additionally programmed and configured to receive input linking data representing one or more goals for achieving the business expectation(s).

7. The system of claim 6 additionally programmed and configured to receive input linking data identifying one or more employees within the enterprise to one or more of the goals for achieving the business expectations.

8. The system of claim 7 additionally programmed and configured to automatically evaluate the product or process measurable data with respect to the one or more goals and the one or more linked employees to display an indication of whether the employee(s) have achieved the goal(s).

9. The system of claim 8 wherein the indication is a traffic light icon.

* * * * *